United States Patent [19]

Brenner

[11] 4,049,750

[45] Sept. 20, 1977

[54] ONE COMPONENT SHELF STABLE LOW SHRINKAGE STRUCTURAL ADHESIVE SYSTEMS

[76] Inventor: Walter Brenner, 974 Columbus Drive, Teaneck, N.J. 07666

[21] Appl. No.: 594,459

[22] Filed: July 29, 1975

[51] Int. Cl.$^2$ .............................................. C08L 67/06
[52] U.S. Cl. .................................... 260/864; 156/332; 260/47 EA; 260/47 UA; 260/837 R; 260/861; 260/868; 260/870
[58] Field of Search .......... 260/47 UA, 479 S, 485 G, 260/861, 864, 868; 526/321, 324, 328; 156/332

[56] References Cited

U.S. PATENT DOCUMENTS

| 2,891,093 | 6/1959 | Hurdis et al. | 260/485 G |
|---|---|---|---|
| 3,179,623 | 4/1965 | Bowen | 260/47 UA |
| 3,455,801 | 7/1969 | D'Alelio | 260/861 X |
| 3,751,399 | 8/1973 | Lee et al. | 260/47 UA |

OTHER PUBLICATIONS

Conix, *Industrial And Engineering Chemistry*, vol. 51, No. 2, (1959), pp. 147–150.

*Primary Examiner*—Howard E. Schain
*Assistant Examiner*—W. C. Danison, Jr.
*Attorney, Agent, or Firm*—Fidelman, Wolffe & Waldron

[57] ABSTRACT

Novel one component shelf stable low shrinkage structural adhesive systems having controlled viscosity which cure at ambient temperatures in the absence of oxygen and at elevated temperature in the presence or absence of oxygen, with minimal dimensional change are disclosed. These adhesive systems comprise polymerizable vinyl ester polymers prepared by vinyl ester termination of certain polymerizable epoxy resins with methacrylic or acrylic acids, and also polyesters, a chemically compatible ethylenically unsaturated organic liquid monomer particularly styrene, and a catalyst/inhibitor system containing a peroxide type polymerization initiator, accelerators and inhibitors as well as, optionally, thixotropic agents, thickeners, dyes, pigments and other additives which will impart specifically desirable use properties. They are also of value as sealants where high performance is required.

13 Claims, No Drawings

ONE COMPONENT SHELF STABLE LOW SHRINKAGE STRUCTURAL ADHESIVE SYSTEMS

BACKGROUND OF THE INVENTION

One component shelf stable structural adhesive and sealant systems are of considerable commercial interest because they offer greater user convenience than the conventionally employed two component structural adhesive and sealants, especially if they can be cured at ambient temperatures. In the past a considerable amount of research and development has been carried out to develop such products. Thus one component epoxy compositions have been developed as adhesives but they require extended elevated temperature cures to attain useful strength properties. Urethane and silicone based adhesives have become available which do cure at ambient temperatures but their cure mechanism is dependent on the availability of water, usually from the atmosphere, which results in serious limitations in their efficacy for many applications. Also cyanoacrylate types of adhesives have been introduced into the adhesives markets which cure in a matter of seconds at ambient temperatures, again by reaction with moisture, even though they have very definite processing and application limitations particularly as regards types of substrates, durability and chemical resistance and they are supplied in a form which can cause severe injury to the skin and eyes.

Perhaps the most successful one component ambient temperature curing adhesive systems which are now employed, are so-called anaerobic compositions which comprise catalyzed polymerizable mixtures based on monomeric acrylate ester monomers. They are normally liquids remaining in that state as long as they contain an adequate amount of oxygen, such as atmospheric oxygen, and polymerization or cure will not commence even though they may contain substantial amounts of room temperature polymerization initiators. When the anaerobic compositions are however placed between surfaces that are relatively impervious to oxygen, the stabilizing effects of atmospheric oxygen is removed and cure commences within a relatively short time. The products now furnished commercially would find many more applications if certain of their critical performance parameters could be improved. These include strength properties particularly toughness, since the cured anaerobics are quite brittle; resistance to chemicals; useful service to temperature range which is at present quite limited both as regards upper and lower service temperatures; and range of applicability to different substrates which are restricted mainly to certain base metal surfaces such as brass, steel and aluminum. Also cure speeds vary with differnt metals ranging from fast with brass to slow for aluminum and finishes on metals such as anodizing, plating and passivating, will slow or prevent cures. Special primers may have to be used which obviously lessen the all important user convenience factor of an ambient temperature curing one component adhesive system. An additional vexing problem with the currently produced anaerobic adhesive compositions is that they are most effective only for bonding surfaces with close clearances and lack gap holding characteristics. This is due to a considerable extent to their substantial shrinkage upon cure. Larger clearances furthermore require more material which significantly reduces cure speed and thus productivity in assembly bonding operations. Practical cure temperatures are very temperature sensitive, lower temperatures requiring much longer cure time. Cure at 40° F for example may require weeks. After many years of research these problems have not been satisfactorily resolved.

The one component structural adhesive systems described below retain the advantageous characteristics of the presently manufactured anaerobic adhesive compositions yet eliminate most of their limiting features thus making them prime candidates for general bonding applications and especially for uses where structural strength of the bond is required together with joint durability, toughness, chemical resistance and thermal stability at elevated temperatures. They are based on polymerizable vinyl ester polymers prepared by the vinyl ester termination of certain polymerizable epoxy resins with methacrylic and acrylic acids, and also polyesters, a chemically compatible ethylenically unsaturated organic liquid monomer such as styrene, diallyphthalate, triallylcyanurate etc. and a catalyst/inhibitor system containing a peroxide type polymerization initiator, accelerators, inhibitors as well as, optionally, thixotropic agents, thickeners, dyes, pigments and other additives which will impart specific use properties desired for production bonding operations and especially where a tough high structural strength joint with durability, chemical resistance and heat stability is needed. The superior performance of the anaerobic compositions disclosed herewith is ascribed to the well known and long proven superior physical strength properties including toughness, excellent chemical resistance, high degree of thermal stability and inherent adhesive characteristics of the epoxy polymer moities and those of selected polyester moities as well as the unique physical and chemical nature of the unsaturated liquid monomers referred to above particularly when compared with those of the polymerized acrylate type monomers which are employed in the presently offered anaerobic adhesive compositions such as di-, tri-, tetra and polyethylene glycol dimethacrylates and the corresponding acrylates, trimethylolpropane trimethacrylate and acrylate etc.

A most important improvement embodied by the novel anaerobic compositions disclosed herewith is a very great reduction in shrinkage upon cure of said above described initially liquid novel anaerobic adhesive compositions. The shrinkage upon cure of the polymerizable modified vinyl ester polymers based upon certain epoxy resins and also polyesters disclosed herewith is substantially below 5%, generally in the order of 2-3% or less. This compares typically with 14.1, 14.5, 14.2 and 14.0% for the di, tri, tetra and polyethyleneglycolmethacrylates, 14% for trimethylolpropane trimethacrylate and over 16% for trimethylolpropanetriacrylate etc. employed in currently offered anaerobics. The much decreased shrinkage of these new anaerobic compositions greatly enhances their inherent effectiveness for adhesive bonding, especially where parts with surface irregularities requiring greater clearances have to be adhered. Furthermore they provide for the much sought after but never hitherto realized gap filling property which is so desirable for both adhesive and sealant applications. The decreased shrinkage is of particular value for adhering parts with variable clearances as it will assure attainment of uniform bond strength with minimal effect of surface irregularities. It is also most advantageous for applications where bonded parts have to undergo repeated thermal cycling etc. which greatly accentuates the dimensional stability requirements of an adhesive.

The completely cured adhesive compositions can be considered to be toxicologically inert and bonded parts present therefore no health problems from handling. Vinyl ester resins of somewhat similar chemical compositions and heat cured with a peroxide initiator have been found to comply with FDA regulation 121.2572 which covers materials intended for repeated use in contact with foods. The liquid compositions and associated materials may be handled safely by personnel following normal industrial standards for good housekeeping and personal hygiene. Those familiar with handling unsaturated polyester and/or epoxy resins will find the precautions necessary for handling the liquid uncured anaerobic compositions disclosed herewith, in bulk the same. They are not regarded as particularly toxic from ingestion. Because of the possible presence of monomers such as styrene, the usual care should be taken to avoid inhalation of vapors and avoid skin and eye contact when handling them in bulk. For adhesive users the only precautions to be taken are those required by good personal hygiene practices.

Anaerobic compositions as outlined above which can provide the following improved performance properties for adhesive and sealant practice would be extremely novel and useful compositions of matter: improved toughness and other physical strength properties which would make the bonded or sealed parts more resistant to vibration and/or impact loading; better resistance to solvents ranging from hot water to organic fluids such as chlorinated hydrocarbons and fuels; improved resistance to thermal degradation as this would permit usage on parts which can be expected to be exposed to increased temperatures in service; resistance to shrinkage upon cure as this would minimize the tendency of the curing sealant or adhesive to pull away from the parts which are to be sealed or bonded or possibly change the dimensions or configuration of the bonded or sealed joint; and freedom from variation of properties of the cured compositions upon aging.

THE INVENTION

The compositions of the invention described herein provide significant product improvements and benefits in many or all of the areas mentioned in the preceding paragraph. These advantageous product characteristics are obtained without any significant adverse effects upon the other desirable properties of the uncured or cured anaerobic compositions now available on the market place. For example the initially liquid uncured anaerobic compositions still retain the excellent stability, speed of cure at ambient temperatures in the absence of oxygen and at elevated temperatures in the presence or absence of oxygen with properties which are discussed in greater detail below.

This invention deals with initially liquid low shrinkage anaerobic compositions which are prepared from polymerizably vinyl ester polymers prepared by vinyl ester termination of certain polymerizable epoxy resins with methacrylic or acrylic acids, a chemically compatible ethylenically unsaturated organic liquid monomer such as styrene, and a catalyst/inhibitor system containing a peroxide type initiator, accelerators and inhibitors as well as, optionally, thixotropic agents, thickeners, pigments and other additives which will impat specifically desirable use properties. The two basic ingredients of the anaerobic compositions to which this invention is directed, are the liquid polymeric and monomeric components broadly characterized as liquid vinyl terminated polymerizable epoxy resins prepared by vinyl termination of certain epoxy resins with methacrylic or acrylic acids, and also polyesters and the chemically compatible ethylenically unsaturated organic liquid monomer such as styrene, diallylphthalate, triallylisocyanurate etc. which in the presence of a suitable catalyst/inhibitor system polymerize to the solid state upon exclusion of oxygen at ambient temperatures and in the presence or absence of oxygen at elevated temperatures. The anaerobic compositions of this invention can contain as much as 80-98% of these two components combined with 90-98% preferred, based on their total weight without additives such as thixotropic agents, thickeners, pigments etc. The relative amounts of liquid vinyl terminated polymerizable epoxy resin or polyester and the chemically compatible ethylenically unsaturated monomer can range from 100/5 to 100/100 with 100/20 to 100/30 preferred, on the same weight basis.

The liquid ethylenically unsaturated organic monomer should as noted be chemically compatible and act as a solvent with low volatility, ready availability at moderate cost etc. for the vinyl terminated polymerizable epoxy resin or polyester and be capable of chemical reaction with it to the solid state in the presence of a suitable catalyst/inhibitor system in the absence of oxygen at ambient temperatures or at elevated temperatures in the presence or absence of oxygen — performance requirements which are met by styrene, vinyl toluene, alpha methyl styrene, vinyl acetate, vinyl pyrrolidone, also various acrylic esters as well as vinyl butadiene telomers, and other functional terminated liquid polybutadienes, selected allylic monomers e.g. diallylphthalate, triallylisocryanurate etc. Styrene monomer is among the preferred compounds either per se or in combination with other monomers to obtain some special properties because of its combination of chemical reactivity, solubility, other pertinent physical and chemical properties, also availability and cost. Other preferred monomers include diallylphthalate, triallylisocyanurate and vinyl pyrrolidone, triallylcyanurate.

The invention also deals with the method of improving the performance of anaerobic compositions comprising the above described vinyl terminated polymerizable epoxy resin or polyesters and the liquid chemically compatible ethylenically unsaturated monomer as well as suitable peroxide initiator/inhibitor systems which convert to the solid state at ambient temperatures in the absence of oxygen or at elevated temperatures in the presence or absence of air with minimum shrinkage so as to prevent the adhesive or sealant from pulling away from the parts to be adhered to or sealed during the cure of the anaerobic composition without increasing their cost.

The invention also concerns bonded or sealed surfaces said surfaces being bonded or sealed with the above described initially liquid anaerobic compositions which after cure to the solid state produce bonds or joints with improved toughness and other physical strength properties, a better degree of chemical resistance, improved thermal stability, long term durability and a much larger service temperature range while retaining the excellent stability, speed of cure etc. of the now available anaerobic adhesive compositions without increasing their cost.

DISCUSSION OF THE INVENTION AND ITS etc. on account of their better strength, heat and chemical resistance, dimensional stability, etc.

vinyl ester resins (bis phenol A based)

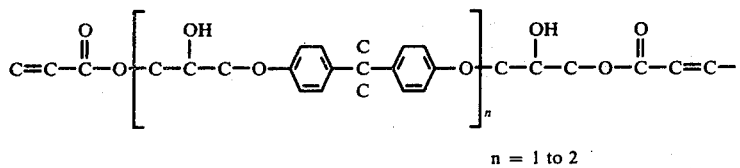

n = 1 to 2 bis phenol A-fumaratic polyesters

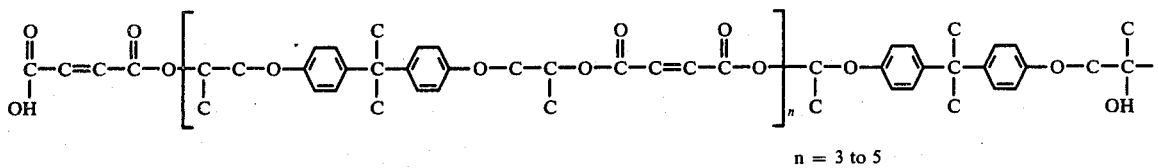

n = 3 to 5

Formula 1: Some Preferred Resin Components for Low Shrinkage Anaerobic Compositions

PREFERRED EMBODIMENTS

As used in the context of this discussion the word "polyesters" refers to the classical usage of the term e.g. compounds prepared by the condensation of dibasic acids and a diol to form thermoplastic polymers having a plurality of ester linkages in the chain. This definition does include polymeric compounds of the same structure prepared by equivalent methods such as when an acid anhydride is substituted for the above mentioned dibasic acid. The term "epoxy" refers to the classical usage of the term e.g. compounds prepared by the catalyzed condensation of polyhydrin phenols or alcohols with epoxy contributing compounds such as epichlorohydrins and alkylene oxides as described for example in U.S. Pat. Nos. 2,456,408 and 2,592,560. This definition includes polymeric compounds of the same general structure prepared with alternative materials and equivalent methods. The terms "vinyl esters" and "vinyl ester resins" are used to describe the reaction products of epoxy resins with methacrylic and acrylic acids and also their monomer solutions. Other terms such as "vinyl epoxy esters", "epoxy acrylates" etc. have been used to describe compounds of analogous compositions. As a matter of fact, probably most epoxy compounds or resins and many of the known unsaturated acids have been converted to a vinyl ester or reactive diluent.

In Formula 1 there are compared two types of resins e.g. vinyl esters prepared by the vinyl termination of certain polymerizable epoxy resins as defined in the previous paragraph, with methacrylic and acrylic acids, and also polyesters made by the reaction of bis phenol A with fumaric acid. Both resin systems are preferred for the low shrinkage anaerobic compositions described in this invention. Other types of epoxy resins including epoxy novolacs, tetraphenylolethane epoxies and cycloaliphatic epoxies can also be reacted with unsaturated organic acids including methacrylic, acrylic, crotonic, cinnamic etc. to produce "vinyl esters" with superior heat and chemical resistance, outdoor durability etc. which are also of considerable value as components for anaerobic compositions useful for carrying out the teachings of this invention. It is to be stressed that the vinyl ester and polyester resins described here are premium performance materials in their own right which are finding wide usage as castings, in reinforced plastics As indicated above the liquid chemically compatible ethylenically unsaturated organic monomer component of the anaerobic compositions of the invention described herein must not only be a nonvolatile, solvent and chemically compatible with the vinyl ester resins or polyesters described in the previous paragraph, but must also be capable of chemical reaction with them to the solid state in the presence of a suitable catalyst/inhibitor system at ambient temperatures with the exclusion of oxygen and at elevated temperatures in the presence or absence of oxygen. This monomer should furthermore have chemical and physical properties such that the resulting solids will be formed from the initially liquid compositions with minimal shrinkage so as to avoid unduly large dimensional changes of the curing adhesive or sealant in order to avoid pulling away of the parts which are to be bonded or sealed or possibly change the dimensions or configuration of the bonded or sealed joint during cure. This indicates that one important additional criterion for selection of the chemically compatible liquid ethylenically unsaturated organic monomer component of the anaerobic compositions of the invention described herein be as low as possible a dimensional change i.e. volume shrinkage upon polymerization or co-polymerization from the monomeric liquid to the polymeric solid form.

A considerable number of liquid chemically compatible ethylenically unsaturated organic monomers are available which can meet these requirements in varying degree including styrene; vinyl toluene; α methylstyrene; chlorinated styrenes; divinylbenzene; methyl and higher alkyl methacrylates and the corresponding acrylates; diallylphthalate; glycidyl methacrylate and acrylate; diallylfumarate; allyl methacrylate and the corresponding acrylate as well as polyfunctional methacrylate and acrylate esters. Typical examples of such polyfunctional methacrylate or acrylate esters. Typical examples of such polyfunctional methacrylate and acrylate ester monomers are di-, tri- and tetraethyleneglycol dimethacrylates and acrylates; diglyceroldimethacrylate and acrylate; butyleneglyoldimethacrylate and acrylate; trimethylolpropanetrimethacrylate and acrylate; and neopentylglycoldimethacrylate and also acrylate. Monomeric polymerizable esters with relatively polar alcoholic moities are also suitable because the polar group tends to provide greater intermolecular attraction during and after cure, thus producing more desirable cure properties, as well as a better and more durable adhesive or sealant. Preferably the polar group may be selected from the category consisting of labile hydrogen, heterocyclic ring, hydroxy, amino, cyano and halogen polar groups. Typical examples of such compounds are cyclohexylmethacrylate and acrylate, tetrahydrofurfuryl methacrylate and acrylate, t-butyl aminoethylmethacrylate and acrylate; cyanoethylmethacrylate and acrylate; chlorethylmethacrylate, acrylonitrile and variously substituted acrylonitriles, triallylcyanurate and isocyanuarate. Polymerizable telomeric compounds of butadiene and copolymers of butadiene with styrene, acrylonitrile etc., the liquid Hycar rubber precursors offered by B. F. Goodrich Chemical Co., and analogous compounds made by Phillips Petroleum Co., the Lithium Corp. of America and others are also potentially valuable ingredients of these anaerobic compositions.

The requirement of minimum shrinkage of the vinyl terminated polymerizable epoxy resin or polyester and liquid chemically compatible ethylenically unsaturated organic monomer upon cure to the solid state so as to avoid pulling away of the parts which are to be bonded or sealed or possibly change the dimensions or configuration of the bonded or sealed joint due to the dimensional changes of the curing adhesive, greatly limits the choice of polymerizable compositions to those with low shrinkage from the liquid to the solid state. As has been described above earlier many monomers such as the di-, tri- and tetraethyleneglycolmethacrylates and acrylates, trimethylpropanetrimethacrylate and acrylate etc. have polymerization shrinkages substantially more than 10%. This is an obvious barrier to their use per se. It has now been found that the vinyl ester resins and the polyesters described as preferred components for the anaerobic composition of the invention described herein can be reacted with monomers such as styrene, diallylphthalate, triallylisocyanurate etc., preferably in the ratio of 100/20 to 100/30 by wt. of the two components to give anaerobic compositions which in the presence of suitable catalyst/inhibitor systems cure at ambient temperatures with exclusion of air and at elevated temperatures in the presence or absence of air to the solid state with a shrinkage generally less than 5% and usually between 2 – 3%. While the exact reason for this wholly unexpected lower shrinkage is not fully understood considering both the ratios of the two components of interest and the chemical properties of alternate monomers, the results are obviously most significant and desirable for high performance adhesive and sealant applications making styrene a preferred monomer. Where some additional specific adhesive or sealant product performance characteristics are desired such as toughness, the preferred unsaturated monomer may be replaced either wholly or in part by a polymerizable telomeric compound of butadiene or a copolymer of butadiene with styrene, acrylonitrile etc. The novel anaerobic compositions comprising said vinyl esters or polyesters and preferred unsaturated monomer in the weight ratios noted above are particularly useful for adhesive and sealant applications because their use avoids pulling away of the parts which are to be bonded or sealed and also negates changes in the dimensions or the configuration of the bonded or sealed joint during cure. This greatly broadens the utility of said anaerobic compositions especially for bonding or sealing parts with wider clearances, and provides the long sought after but thus far never realized gap filling property hitherto lacking in this type of one component adhesive and sealant system and must be regarded as a major though wholly unexpected technical improvement in the state of the art.

As described above the anaerobic compositions as discussed herein are prepared by mixing a suitable catalyst/inhibitor system containing a peroxide type initiator, with vinyl ester resins or polyesters as described above. Certain peroxides especially dialkylperoxides and hydroperoxides are well known initiators of the polymerization of vinyl ester resins and polyesters. The polymerization of these polymerizable resinous materials is catalyzed by these free radical generating initiators in much the same manner as unsaturated polyesters. The use of polymerization promoters such as cobalt soaps and tertiary amines is also well known from unsaturated polyester technology. Because there are so many variables affecting the cure of the resin, the peroxide and/or promoter system must be adjusted to best meet specific applications, and care must be taken to assure that proper balance of initiators and promoters be obtained and maintained in order to optimize cure. The selection of a cure system is even more critical with anaerobic compositions which require a catalyst/inhibitor system to assure cure at ambient temperatures in the presence of air and at elevated temperatures in the absence of oxygen or the presence of oxygen. The function of the catalyst component is to assure cure at the desired conditions while that of the inhibitor is to provide for adequate shelf life in the presence of oxygen until cure is desired to commence.

Typical catalyst systems for the novel low shrinkage anaerobic compositions disclosed in this invention comprise a peroxide type initiator and a promoter. Preferred initiators are organic hydroperoxides and mixtures of organic hydroperoxides with other peroxides such as dialkyl peroxides. Included within this statement are materials such as organic peroxides or organic peresters which decompose to form organic hydroperoxides in situ. Examples of such peroxides are cyclohexyl hydroxy-cyclohexyl peroxide and t-butyl perbenzoate, respectively. The nature of the organic hydroperoxides is considered not critical to the broad concept of this invention. The general class of hydroperoxides can be represented by the formula R'OOH where R' is a hydrocarbon group containing up to about 18 carbon atoms and preferably is an alkyl, aryl, or aralkyl hydrocarbon group containing from about 3 to 12 carbon atoms. R' can of course contain any substituent or linkage, hydrocarbon or otherwise, which does not affect the hydroperoxide for the purpose disclosed herein. Typical examples of such organic hydroperoxides are cumene hydroperoxide, t-butyl hydroperoxide, methyl ethyl ketone hydroperoxide and hydroperoxides formed by oxygenation of various hydrocarbons such as methylbutene, octane and cyclohexene and various ketones and ethers.

The organic hydroperoxide initiators can be used within rather wide ranges i.e. from about 0.05% to as much as about 20% by wt. of the anaerobic composition. More usually however they comprise 10% or less by weight of the anaerobic composition since above that level undesirable effects on the strength and the durability of the anaerobic compositions may be observed. While in certain situations lower amounts can be used, about 0.1% by weight of the hydroperoxide is frequently used as a lower limit. Preferred concentrations of the hydroperoxide initiator range from 0.1% to about 5% by weight of the anaerobic composition. Dialkyl peroxides of various types may be advantageously added to the hydroperoxide initiator to maximize certain desirable effects such as substrate adhesion, degree and rate of cure etc. They are generally employed in the same concentration range as the hydroperoxides. Typical dialkyl peroxides are dicumylperoxide; 2,5 dimethyl-2,5-di(t-butylperoxy)-hexane; 1,1 bis (t-butylperoxy)-3,3,5-trimethylcyclohexane and di-t-butylperoxide.

Useful additives for anaerobic compositions are latent polymerization accelerators or cure promoters, compounds which do not themselves initiate the desired cure but which accelerate the cure once it has been started by the polymerization initiator. A large number of polymerization accelerators or promoters are known and used in the art of free radical polymerization especially as applied to unsaturted polyesters and the broad concept of this invention is intended to encompass any polymerization accelerator which can be incorporated into the anaerobic composition without deleteriously affecting the shelf life or performance of such compositions. Tertiary amines can be used to advantage including compounds with alkyl, aryl and aralkyl groups containing up to about eight carbon atoms. These compounds are widely known to those skilled in the art of free radical polymerizations. Primary and secondary amines can also be employed with success including those primary and secondary amines with alkyl groups up to about ten carbon atoms. Heterocyclic secondary amines with hydrogenated heterocyclic rings such as piperazine and pyrrolidone, are also effective. Polyamines are good promoters with compounds such as 1,2 propane diamine, 1,3 propane diamine, tetraethylene petamine, ethylene diamine and N-(2 ethanol)ethylene diamine known for their activity which is further enhanced by the addition of small amounts of organic acids e.g. formic, acetic, proprionic, hexanoic and 2-ethyl hexanoic acid. Amides having an aliphatic hydrocarbon group with from 1–20 carbon atoms such as formamide, dimethylacetamide etc. are likewise effective accelerators. Organic sulfimides and alkyl imides are also most useful. The promoters can be used alone or in combinations as required. The proportions of these promoters in the anaerobic compositions can be widely varied depending upon the cure characteristics desired. They generally range between 0.1% and 5% by weight of the anaerobic compositions with 1% – 3% by weight preferred.

Polymerization inhibitors are essential to maintain shelf life of the uncured compositions in the presence of oxygen at ambient temperatures. Many different polymerization inhibitors are known for free radical polymerizations and are applicable here. One widely used class of polymerization inhibitors which has been found particularly effective for the novel low shrinkage anaerobic adhesive and sealant compositions which are disclosed in this invention, are the quinones. Typical compounds include hydroquinone, $\beta$-naphthoquinone, 2 methoxy-1,4 naphthoquinone, and p-benzoquinone. Concentrations required are generally small, e.g. 50–200 ppm by wt.

Other typical ingredients which can be employed if desired to impart specific user desirable properties to such low shrinkage anaerobic compositions include thixotropic agents, thickeners, pigments, dyes, adhesive agents and fillers. Such materials can be used in any combination and proportion as desired provided that they do not adversely affect the anaerobic nature of the composition, or other essential properties thereof. While exceptions may exist in certain cases, these materials taken together generally comprise no more than about 60% by weight of the total composition and preferably not more than about 30% by weight of the composition. The specific additives are well known in the art of formulating unsaturated polyesters and also epoxy resins. The above described novel low shrinkage anaerobic compositions can generally be prepared by the use of any conventional liquid mixing techniques since most if not all of the components are readily soluble or dispersible. High shear mixing may be required to produce certain heavily filled anaerobic compositions for uniform dispersion of the fillers etc.

EXAMPLES

The following examples are given to demonstrate processes, compositions and bonded assemblies within the scope of the invention disclosed herein. The examples are not intended to be limitations in any way upon the scope of the invention. Unless specifically stated to the contrary, all ratios and percentages in the following examples are expressed on a weight basis.

EXAMPLE I

Technical grade commercially available bisphenyl A type epoxy resin (Dow Chemical Co. DER331 or equivalent) was used to synthesize Vinyl Ester Resin I-A1. The epoxy resin (95 gms, 0.5 moles), acrylic acid (36 gms, 0.5 moles), triethylbenzylammonium chloride (2 gms) and monomethoxy hydroquinone were stirred for 2 hours at 100°–110° C. The mixture was cooled down to room temperature, let down with 30 weight % styrene monomer and analyzed (degree of esterification, 99.9 mole %). The analogous reaction was carried out with methacrylic acid, let down with 30% by weight of styrene monomer and the product called Vinyl Ester Resin I-B1. The products obtained by letting down the reaction products of the bisphenol A epoxy resin and acrylic acid with 30% by weight of each triallylcyanurate, diallylphthalate and vinyl pyrrolidone monomers were called Vinyl Ester Resins I-A2, I-A3 and I-A4 respectively. The analogous reaction products of the bisphenol A epoxy resin and methacrylic acid, let down with 30% by weight of each triallylcyanurate, diallylphthalate and vinyl pyrrolidone were called Vinyl Ester Resins I-B2, I-B3 and I-B4 respectively.

EXAMPLE II

Technical grade commercially available propylene glycol type epoxy resin (Dow Chemical Co. DER736 or equivalent) was used to synthesize Vinyl Ester Resin II-A1. The epoxy resin (95 gms, 0.5 moles), acrylic acid (36 gms, 0.5 moles), triethylbenzylammonium chloride (2 gms) and monomethoxy hydroquinone were reacted for 2 hours at 100°–110° C. The mixture was cooled down to room temperature, let down with 30% weight of styrene monomer and analyzed (degree of esterification, 99.8%). The analogous reaction was carried out with methacrylic acid, let down with 30% by weight of styrene monomer and the product called Vinyl Ester Resin II-B1. The products obtained by letting down the reaction products of the epoxy resin and acrylic acid with 30% by weight of each triallylcyanurate, diallylphthalate and vinyl pyrrolidone monomers were called Vinyl Ester Resins II-A2, II-A3 and II-A4 respectively. The analogous reaction products of this epoxy resin and methacrylic acids, let down with 30% by weight of each triallylcyanurate, diallylphthalate and vinyl pyrrolidone monomers were called Vinyl Ester Resins II-B2, II-B3 and II-B4 respectively.

EXAMPLE III

Technical grade commercially available phthalic ester type epoxy resin (Showa Denko Syodyne 508 or equivalent) was used to synthesize Vinyl Ester Resin III-A1. The epoxy resin (95 gms, 0.5 moles), acrylic acid (36 gms, 0.5 moles), triethylbenzylammonium chloride (2 gms) and monomethoxy hydroquinone were reacted for 2 hours at 100°-110° C. The mixture was then cooled down to room temperature, let down with 30 weight % of styrene monomer and analyzed (degree of esterification, 97.8%). The analogous reaction was carried out with methacrylic acid, let down with 30% by weight of styrene monomer and the product called Vinyl Ester Resin III-B1. The products obtained by letting down the reaction product of this epoxy resin and acrylic acid with 30% by weight each of triallylcyanurate, diallylphthalate and vinyl pyrrolidone monomers were called Vinyl Ester Resins III-A2, III-A3 and III-A4 respectively. The analogous products of this epoxy resin and methacrylic acid let down with 30% by weight each of triallylcyanurate, diallylphthalate and vinyl pyrrolidone monomers were called Vinyl Ester Resins III-B2, III-B3 and III-B4 respectively.

EXAMPLE IV

Three liquid one component structural adhesive sealant compositions were prepared by mixing the following ingredients in the approximate weight percentages listed:

| A | | B | | C | |
|---|---|---|---|---|---|
| Vinyl Ester Resin I-A1 | 97.80% | Vinyl Ester Resin I-A2 | 98.35% | Vinyl Ester Resin I-A4 | 98.35% |
| Cumene hydroperoxide | 0.28% | t-butyl hydroperoxide | 0.24% | t-butyl hydroperoxide(70%) | 0.49% |
| Dimethyltoluidine | 0.28% | Dimethyltoluidine | 0.20% | Benzoic sulfimide | 0.49% |
| Dimethylformamide | 0.31% | Benzoic sulfimide | 0.36% | Dimethyltoluidine | 0.40% |
| p-benzoquinone | 470 ppm | p-benzoquinone | 640 ppm | p-benzoquinone | 500 ppm |

A portion of each of the three compositions was stored in low density polyethylene bottles and tested periodically using an accelerated aging test in order to ascertain if the products would be stable over an extended period of time. The accelerated aging test consisted of placing about two milliliters of a composition in a standard ten milliliter test tube and immersing the test tube in a constant temperature water bath maintained at 80°-82° C. The time when the composition gels and begins to solidify at that temperature was noted. As a correlation of the test procedure with actual storage conditions, an adhesive composition free from gelling after 30 minutes under the accelerated aging conditions of the test will also be free from gelling at ambient temperatures for at least a year. In the test the adhesive composition "A" was found to gel in 66 minutes. Compositions B and C gelled in 37 and 42 minutes respectively. Thereafter the composition was tested from time to time in the same manner to determine whether the product was becoming less stable, as evidenced by shorter cure times at 80°-82° C. No deleterious change in stability was observed over a period of several months, indicating that the compositions exhibited commercially useful shelf stability.

The adhesive and sealant performance of the compositions was evaluated on various surfaces. Several drops of each of the compositions were placed on the threads of each of a number of mild steel, aluminum, zinc plated and cadmium plated nuts and bolts and the nuts and bolts were assembled by screwing the nut onto the bolt until about three threads of the bolt were left exposed below the nut. The nut and bolt assemblies were permitted to remain at ambient temperature in that condition for about 24 hours. The assemblies were then tested by attempting to turn the nut relative to the bolt and it was found that they could not be turned by hand. The break torque required to produce the movement needed to break the parts was found, using a standard torque wrench, and determined to be in excess of 30 lbs. for composition A and 105 lbs. for composition B. The break torque obtained with composition C was 88 lbs. Successful bonding was also obtained with similarly formulated structural adhesive sealant compositions based on Vinyl Esters I-A3 and I-B1, I-B2, I-B3 and I-B4. The highest strength properties were realized with an adhesive sealant composition employing Vinyl Ester I-B2 at ambient temperatures. The test data refer to mild steel nut and bolt assemblies.

EXAMPLE V

Liquid one component structural adhesive sealant compositions were prepared by mixing the ingredients shown in Table 1 below in the approximate weight percentages listed. The various compositions were tested for extended shelf life using the accelerated aging test described in Example IV and the time to gel noted. The adhesive/sealant characteristics of the compositions were determined with bolt-nut assemblies prepared in the same manner as described in Example IV and found to be in excess of 25 lbs. for all the assemblies tested after they had been permitted to cure under exclusion of oxygen for about twenty-four hours. The test data show that shelf life can be greatly enhanced by increasing the dimethylformamide component. Similar results were obtained with suitably formulated adhesive/sealant compositions based on Vinyl Ester Resins I-A2, I-A3 and I-A4 with the highest torque strength at ambient temperatures recorded for that containing Vinyl Ester I-A2. The test data refer to mild steel nut and bolt assemblies.

Table No. 1

| Adhesive/sealant composition | 1 | 2 | 3 | 4 |
|---|---|---|---|---|
| Vinyl Ester Resin I-A1, % ; | 97.89 | 97.80 | 97.50 | 96.85 |
| Cumenehydroperoxide, % ; | 0.28 | 0.28 | 0.28 | 0.28 |
| Dimethyltoluidine, % ; | 0.28 | 0.28 | 0.28 | 0.28 |
| Dimethylformamide, % ; | 0.17 | 0.31 | 0.62 | 1.28 |
| p-benzoquinone, ppm ; | 482 | 470 | 465 | 460 |

Table No. 1-continued

| Adhesive/sealant composition | 1 | 2 | 3 | 4 |
|---|---|---|---|---|
| gel time at 80–82° C, minutes ; | 60 | 66 | 74 | 114 |

EXAMPLE VI

Liquid one component structural adhesive sealant compositions were prepared by mixing the ingredients shown in Table 2 below in the approximate weight percentages listed. The various compositions were then tested for extended shelf life using the accelerated aging test described in Example IV and the time to gel noted. The adhesive/sealant characteristics were also determined using the bolt/nut assemblies prepared in the same manner as described in Example IV. Acetone was used for viscosity control.

Table No. 2

| Adhesive/sealant composition | 1 | 2 | 3 | 4 | 5 |
|---|---|---|---|---|---|
| Vinyl Ester Resin I-B1, % ; | 92.58 | 91.34 | 92.48 | 92.51 | 92.37 |
| Cumenehydroperoxide, % ; | 0.117 | 0.180 | 0.250 | 0.326 | 0.325 |
| Dimethyltoluidine, % ; | 0.137 | 0.137 | 0.137 | 0.139 | 0.136 |
| Benzoic sulfimide, % ; | 0.59 | 0.57 | 0.58 | 0.56 | 0.55 |
| p-benzoquinone, ppm ; | 440 | 450 | 392 | 396 | 395 |
| Acetone, % ; | 7.56 | 7.73 | 7.45 | 7.56 | 6.95 |
| gel time at 80–82° C, minutes ; | 56 | 38 | 18 | 20 | 20 |
| break torque, # | 51 | 45 | 46 | — | — |

The test data show that commercially acceptable adhesive/sealant properties were obtained with quite a range of cumenehydroperoxide initiator concentrations both as regards shelf life and break torque. The acetone apparently did not affect strength properties deleteriously. Also the highest cumenehydroperoxide concentrations evaluated resulted in gel times too low to be satisfactory for commercial applications e.g. less than the 30 minutes as discussed in the accelerated aging test which has been described in the Example IV above. The initiator t-butyl hydroperoxide (70%) could be used in place of the cumenehydroperoxide. A preferred concentration of this initiator was 0.23%. Commercially acceptable bonds were also obtained with suitably formulated adhesive/sealant compositions based on Vinyl Ester Resins I-B2, I-B3 and I-B4 with that containing Vinyl Ester I-B2 showing highest strength at ambient temperatures.

EXAMPLE VII

Liquid one component structural adhesive/sealant compositions were prepared by mixing the ingredients shown in Table 3 below in the approximate weight percentages listed. The various compositions were then tested for extended shelf life and break torque using the procedures described in Example IV. The test data show clearly the effect of changing the cumenehydroperoxide amount on both gel time and break torque. As expected gel time at 80°–82° C decreased with cumenehydroperoxide concentration increases. Satisfactory results were also obtained with suitably formulated adhesive/sealant compositions based on Vinyl Ester Resins II-A2, II-A3 and II-A4.

Table No. 3

| Adhesive/sealant compositions | 1 | 2 | 3 | 4 |
|---|---|---|---|---|
| Vinyl Ester Resin, II-A1, % ; | 97.87 | 97.62 | 97.38 | 97.25 |
| Cumenehydroperoxide, % ; | 0.243 | 0.487 | 0.780 | 0.945 |
| Dimethyltoluidine, % ; | 0.196 | 0.196 | 0.196 | 0.196 |
| Benzene sulfinic acid, % ; | 0.260 | 0.260 | 0.260 | 0.260 |
| p-benzoquinone, ppm ; | 503 | 502 | 509 | 518 |
| gel time at 80–82° C, minutes ; | 45 | 41 | 34 | 28 |
| break torque, # | 33 | 41 | 45 | 50 |

EXAMPLE VIII

Liquid one component structural adhesive/sealant compositions were prepared by mixing the ingredients shown in Table 4 below in the approximate weight percentages listed. The various compositions were then tested for extended shelf life and break torque using the procedures descriged in Example IV. The test data show Lupersol 101 peroxide to be an ineffective peroxide initiator for ambient temperature cures when used alone. The use of either t-butyl hydroperoxide (70%) or cumenehydroperoxide as initiators proved however suitable for achieving ambient temperature cures.

Table No. 4

| Adhesive/sealant compositions | 1 | 2 | 3 | 4 | 5 | 6 |
|---|---|---|---|---|---|---|
| Vinyl Ester Resin II-B1, % ; | 97.83 | 96.99 | 96.12 | 95.46 | 97.84 | 97.73 |
| Lupersol 101* (Lucidol Co.), % ; | 0.27 | 0.54 | 0.87 | 1.08 | — | — |
| t-butyl hydroperoxide (70%), % ; | — | — | — | — | 0.24 | — |
| Cumenehydroperoxide, % ; | — | — | — | — | — | 0.32 |
| Dimethyltoluidine, % ; | 0.20 | 0.19 | 0.21 | 0.21 | 0.21 | 0.20 |
| Benzene sulfinic acid, % ; | 0.54 | 0.52 | 0.52 | 0.52 | 0.26 | 0.26 |
| p-benzoquinone, ppm ; | 502 | 490 | 500 | 504 | 496 | 512 |
| gel time at 80–82° C, minutes ; | >1.5 days | >1.5 days | >1.5 days | >1.5 days | 44 | 41 |
| break torque, # | no cure | no cure | no cure | no cure | 35 | 38 |

*2,5 dimethyl, 2,5 di-t-butyperoxy hexane

Similar results were obtained with suitably based adhesive/sealant compositions based on Vinyl Ester Resins II-B2, II-B3 and II-B4. The adhesive/sealant composition based on Vinyl Ester Resin II-B2 showed superior strength properties both at ambient temperatures and at an elevated temperature of 300° F.

EXAMPLE IX

Liquid one component structural adhesive/sealant compositions were prepared by mixing the ingredients shown in Table 5 below in the approximate weight percentages listed. The various compositions were then tested for extended shelf life and break torque using the procedures described in the above presented Example IV. The test data show commercially acceptable shelf lives and break torques for all the Vinyl Ester Resin III-A1 based compositions listed using the cumenehydroperoxide initiator. The Vinyl Ester Resin III-A2 based compositions with the t-butyl hydroperoxide initiator had substantially higher torque strengths but their pot life was quite sensitive to variations in the concentration of the ingredients of the catalyst/accelerator system.

Table No. 5

| Adhesive/sealant composition | 1 | 2 | 3 | 4 | 5 | 6 |
|---|---|---|---|---|---|---|
| Vinyl Ester Resin III-A1, % ; | 97.81 | 97.67 | 97.43 | 97.66 | — | — |
| Vinyl Ester Resin III-A2, % ; | — | — | — | — | 98.84 | 98.35 |
| Cumenehydroperoxide, % ; | 0.127 | 0.233 | 0.489 | 0.502 | — | — |
| t-butyl hydroperoxide(70%), % ; | — | — | — | — | 0.24 | 0.49 |
| Dimethyltoluidine, % ; | 0.12 | 0.12 | 0.12 | 0.12 | 0.20 | 0.50 |
| Benzene sulfinic acid, % ; | 0.54 | 0.54 | 0.54 | 0.54 | 0.33 | 0.50 |
| p-benzoquinone, ppm ; | 500 | 503 | 501 | 508 | 640 | 543 |
| gel time at 80-82° C, minutes ; | 54 | 54 | 45 | 39 | 37 | 18 |
| break torque, # | 45 | 49 | 46 | 44 | 103 | 106 |

Adhesive/sealant compositions employing Vinyl Ester Resins III-A3 and III-A4 could also be formulated to produce commercially acceptable pot lives and torque strengths.

EXAMPLE X

Liquid one component structural adhesive/sealant compositions were prepared by mixing the ingredients shown in Table 6 in the approximate weight percentages listed. The various compositions were then tested using the procedures described in the above presented Example IV for extended shelf life and break torque.

Table No. 6

| Adhesive sealant composition | 1 | 2 | 3 |
|---|---|---|---|
| Vinyl Ester Resin III-B1, % ; | 97.71 | 97.58 | 95.22 |
| t-butyl hydroperoxide, % ; | 0.125 | 0.250 | 0.244 |
| Dicumylperoxide, % ; | — | — | 2.42 |
| Dimethyltoluidine, % ; | 0.20 | 0.20 | 0.20 |
| Benzoic sulfimide, % ; | 0.54 | 0.54 | 0.54 |
| p-benzoquinone, ppm ; | 500 | 503 | 503 |
| gel time at 80-82° C, minutes ; | 35 | 23 | 20 |
| break torque, # | 40 | 48 | 43 |

The test data show that increasing the t-butylhydroperoxide concentration results in lowered shelf life but greater assembly break torque. The addition of the dicumylperoxide further reduces shelf life but also lowers strength. Similar results were obtained with adhesive/sealant compositions based on Vinyl Ester Resins III-B2, III-B3 and III-B4.

EXAMPLE XI

Liquid one component structural adhesive/sealant compositions were prepared by mixing the ingredients shown in Table 7 in the approximate weight percentages listed. The various compositions were then tested using the procedures described in the above presented Example IV for extended shelf life and break torque.

Table No. 7

| | A | B | C |
|---|---|---|---|
| Vinyl Ester Resin I-A4, % ; | — | — | 98.63 |
| Vinyl Ester Resin II-A4, % ; | 98.45 | 98.00 | — |
| Vinyl Ester Resin III-A4, % ; | — | 98.53 | — |
| t-butylhydroperoxide (70%), % ; | 0.49 | 0.50 | 0.49 |
| Benzoic sulfimide, % ; | 0.49 | 0.49 | 0.50 |
| Dimethyltoluidine, % ; | 0.40 | 0.39 | 0.39 |
| p-benzoquinone, ppm ; | 501 | 491 | 493 |
| gel time at 80-82° C, minutes ; | 51 | 49 | 52 |
| break torque, # | 90 | 88 | 91 |

The test data show that Vinyl Ester Resins I-A4, II-A4 and III-A4 could be readily formulated to give adhesive/sealant compositions with commercially acceptable shelf lives and torque strengths. These three different Vinyl Ester Resins contained various epoxy acrylate condensates but all were compounded with the same monomer type and amount.

I claim:

1. A liquid one component structural adhesive composition having controlled viscosity which is stable at ambient temperatures for an extended time period in the presence of oxygen but cures at ambient temperatures in the absence of oxygen or at elevated temperatures in the presence or absence of oxygen to the solid state with low shrinkage said composition comprising a polyester based on the reaction of bisphenol A with fumaric acid having typically the chemical formula configuration

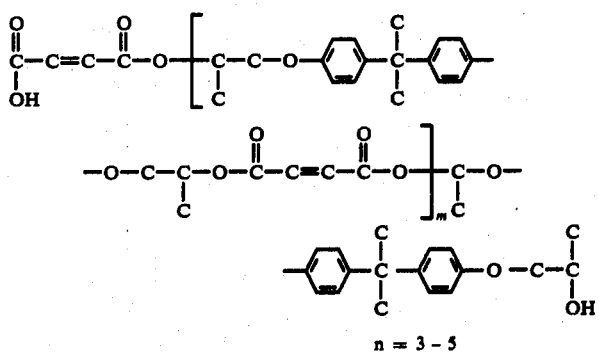

n = 3 - 5 said polymerizable polyester amounting to between 70 - 98% of the adhesive composition, a chemically compatible ethylenically unsaturated organic liquid monomer, a catalyst/inhibitor system containing a peroxide type initiator, accelerators and inhibitors as well as, optionally, thixotropic agents, thickeners, dyes, pigments and other additives which will impart desirable use properties.

2. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 wherein the chemically compatible ethylenically unsaturated organic liquid monomer is selected from the classes consisting of styrene, vinyl toluene, and alpha methyl styrene, chlorostyrenes and divinylbenzenes, diallylphthalate and vinyl pyrrolidene and comprises from about 5% to about 30% by weight of the composition.

3. The liquid one component structural adhesive compositions having controlled viscosity which are stable at ambient temperatures for an extended time period in the presence of oxygen but cure at ambient temperatures in the absence of oxygen or at elevated temperatures in the absence or presence of oxygen to the solid state with low shrinkage of claim 1 where the chemically compatible ethylenically unsaturated organic liquid monomer is styrene, diallylphthalate, vinyl pyrrolidene or mixtures thereof and comprises from about 5% to about 30% by weight of the composition.

4. The liquid one component structural adhesive compositions having controlled viscosity which are stable at ambient temperatures for an extended time period in the presence of oxygen but cure at ambient temperature in the absence of oxygen or at elevated temperatures in the presence or absence of oxygen to the solid state with low shrinkage of claim 1 where the catalyst/inhibitor system contains a peroxide type initiator selected from the class of organic hydroperoxides or compounds which decompose to form hydroperoxides in situ said hydroperoxide or hydroperoxide precursor comprising from about 0.1% to 10% by weight of the composition.

5. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 where the catalyst/inhibitor system which contains a peroxide type initiator selected from the class of organic hydroperoxides, contains cumenehydroperoxide from about 0.1 to 10% by weight of the composition.

6. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 where the catalyst/inhibitor system contains peroxide type initiators selected from the classes of organic hydroperoxides and dialkylperoxides each comprising from about 0.1 to 10% by weight of the composition.

7. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 where the catalyst/inhibitor system contains two peroxide type initiators namely cumene hydroperoxide and dicumylperoxide each comprising from about 0.1 to 10% by weight of compositions.

8. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 where the catalyst/inhibitor system contains two peroxide type initiators namely cumen hydroperoxide and ditertiary butyl peroxide each comprising from about 0.1 to 10% by weight of the compositions.

9. The liquid one component structural adhesive compositions having controlled viscosity which are stable at ambient temperatures for an extended time period in the presence of oxygen but cure at ambient temperatures in the absence of oxygen or at elevated temperatures in the presence or absence of oxygen to the solid state with low shrinkage of claim 1 where the catalyst/inhibitor systems contain accelerators or cure promoters selected from the classes of alkyl, aryl, aralkyl amines, including polyamines, alkyl amides, alkyl, aryl and aralkyl imides comprising in toto from about 0.1 – 5% by weight of the compositions.

10. The liquid one component structural adhesive compositions having controlled viscosity which are stable at ambient temperatures for an extended time period in the presence of oxygen but cure in the absence of oxygen at ambient temperatures and at elevated temperatures in the presence or absence of oxygen to the solid state with low shrinkage of claim 1 where the catalyst/inhibitor system contains accelerators or cure promoters selected from the classes of aralkyl amines and alkyl amides or alkyl or aralkyl imides comprising in toto from about 0.1 to 3% by weight of the compositions.

11. The liquid one component structural adhesive compositions having controlled viscosity which are stable at ambient temperatures for an extended time period in the presence of oxygen but cure in the absence of oxygen at ambient temperatures and at elevated temperatures in the presence or absence of oxygen to the solid state with low shrinkage of claim 1 where the catalyst/inhibitor system contains inhibitors selected from the group of known free radical polymerization inhibitors comprising from about 10 – 1000 ppm by weight of the compositions.

12. The liquid one component structural adhesive compositions having controlled viscosity which are stable at ambient temperatures for an extended time period in the presence of oxygen but cure in the absence of oxygen at ambient temperatures and at elevated temperatures in the presence or absence of oxygen to the solid state with low shrinkage of claim 1 where the catalyst/inhibitor system contains inhibitors selected from the class of quinones such as hydroquinone and p-benzoquinone comprising from about 10 – 1000 ppm by weight of the compositions.

13. A process for adhering or sealing surfaces by applying the liquid compositions of claim 1 and curing in the absence of oxygen at ambient temperatures or at elevated temperatures in the presence or absence of oxygen to the solid state with little shrinkage.

* * * * *